United States Patent
Kojima et al.

(10) Patent No.: US 8,216,690 B2
(45) Date of Patent: Jul. 10, 2012

(54) ELECTROPHOTOGRAPHIC BELT AND ELECTROPHOTOGRAPHIC APPARATUS

(75) Inventors: Hiroomi Kojima, Yokohama (JP); Kouichi Uchida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/104,322

(22) Filed: May 10, 2011

(65) Prior Publication Data

US 2011/0213097 A1 Sep. 1, 2011

Related U.S. Application Data

(63) Continuation of application No. PCT/JP2010/007403, filed on Dec. 21, 2010.

(30) Foreign Application Priority Data

Dec. 28, 2009 (JP) .................. 2009-297563

(51) Int. Cl.
  *G03G 15/16* (2006.01)
  *C08L 67/00* (2006.01)
  *C08L 83/16* (2006.01)

(52) U.S. Cl. ........ 428/480; 399/308; 525/420; 525/437; 525/446

(58) Field of Classification Search ................. 428/480; 525/420, 437, 446; 399/308
  See application file for complete search history.

(56) References Cited

U.S. PATENT DOCUMENTS

| 5,250,994 A | 10/1993 | Ito et al. |
| 7,215,913 B2 | 5/2007 | Miyamoto |
| 2005/0244196 A1 | 11/2005 | Miyamoto |

FOREIGN PATENT DOCUMENTS

| JP | 04-216562 A | | 8/1992 |
| JP | 7-149061 | * | 6/1995 |
| JP | 10-100168 A | | 4/1998 |
| JP | 2005-316040 A | | 11/2005 |

OTHER PUBLICATIONS

International Search Report completed Feb. 8, 2011, and a Written Opinion of the International Searching Authority completed Jan. 27, 2011, in parent application PCT/JP2010/007403.

* cited by examiner

*Primary Examiner* — Ana Woodward
(74) *Attorney, Agent, or Firm* — Fitzpatrick, Cella, Harper & Scinto

(57) ABSTRACT

An electrophotographic belt, excellent in surface lubrication property and smoothness, includes at least one selected from the group consisting of a polyalkylene terephthalate and a polyalkylene naphthalate, and a thermoplastic silicone elastomer having a specific structure.

5 Claims, 3 Drawing Sheets

ELECTROPHOTOGRAPHIC BELT AND ELECTROPHOTOGRAPHIC APPARATUS

CROSS-REFERENCE TO RELATED APPLICATIONS

This application is a continuation of International Application No. PCT/JP2010/007403, filed Dec. 21, 2010, which claims the benefit of Japanese Patent Application No. 2009-297563, filed Dec. 28, 2009.

BACKGROUND OF THE INVENTION

1. Field of the Invention

The present invention relates to an electrophotographic belt and an electrophotographic apparatus.

2. Description of the Related Art

Japanese Patent Application Laid-Open No. 2005-316040 discloses an invention the object of which is to provide an intermediate transfer belt which is excellent in surface filming resistance and transferability over a long period of time and suppresses wear of a cleaning blade. The patent literature further describes that this object can be achieved by a transfer belt including a matrix resin and a chain silicone, wherein the content of the silicone relative to the matrix resin is 0.5 to 10% by weight. A chain organopolysiloxane is mentioned as the silicone used in the invention according to the patent literature.

SUMMARY OF THE INVENTION

The present inventors have studied the transfer belt according to the invention described in Japanese Patent Application Laid-Open No. 2005-316040 and found the following problem. Specifically, in order to uniformly improve the surface lubrication property of the transfer belt, it is necessary to knead a matrix resin and silicone to uniformly disperse the silicone in the matrix resin.

Incidentally, there is a desire to use a polyalkylene terephthalate and a polyalkylene naphthalate which are excellent in flexing durability as a resin used for the electrophotographic belt. These resins have a very high melting point (softening point) of about 260° C. Therefore, when these resins are kneaded together with conventional silicones, the kneading needs to be performed at a temperature of 260° C. or higher. However, the expected effect of improving the belt surface properties may not be obtained because the conventional silicones are decomposed or crosslinked to each other at such high temperatures.

Therefore, the present invention is directed to providing an electrophotographic belt which includes, as a matrix resin, a polyalkylene terephthalate or a polyalkylene naphthalate each having a high melting point and is excellent in surface release properties, a lubrication property, and secondary transferability.

The present invention is also directed to providing an electrophotographic image apparatus which has an intermediate transfer belt and can stably form a high quality electrophotographic image.

According to one aspect of the present invention, there is provided an electrophotographic belt comprising (A) at least one selected from the group consisting of a polyalkylene terephthalate and a polyalkylene naphthalate and (B) a thermoplastic silicone elastomer having a repeating structural unit represented by the following formula (I):

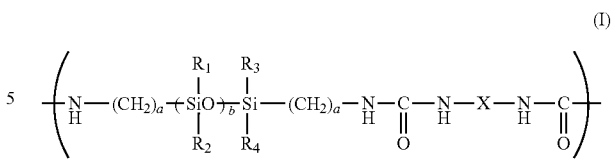

wherein $R_1$ to $R_4$ independently represent a monovalent hydrocarbon group having 1 to 20 carbon atoms; X represents a divalent hydrocarbon group having 2 to 20 carbon atoms; a is an integer of 2 to 10; and b is an integer of 1 to 4,000.

According to a further aspect of the present invention, there is provided an electrophotographic apparatus comprising the above electrophotographic belt as an intermediate transfer belt.

According to the present invention, excellent surface properties can be imparted also to an electrophotographic belt including, as a matrix resin, at least one selected from the group consisting of a polyalkylene terephthalate and a polyalkylene naphthalate each having a high melting point.

DESCRIPTION OF THE EMBODIMENTS

Figure 1:
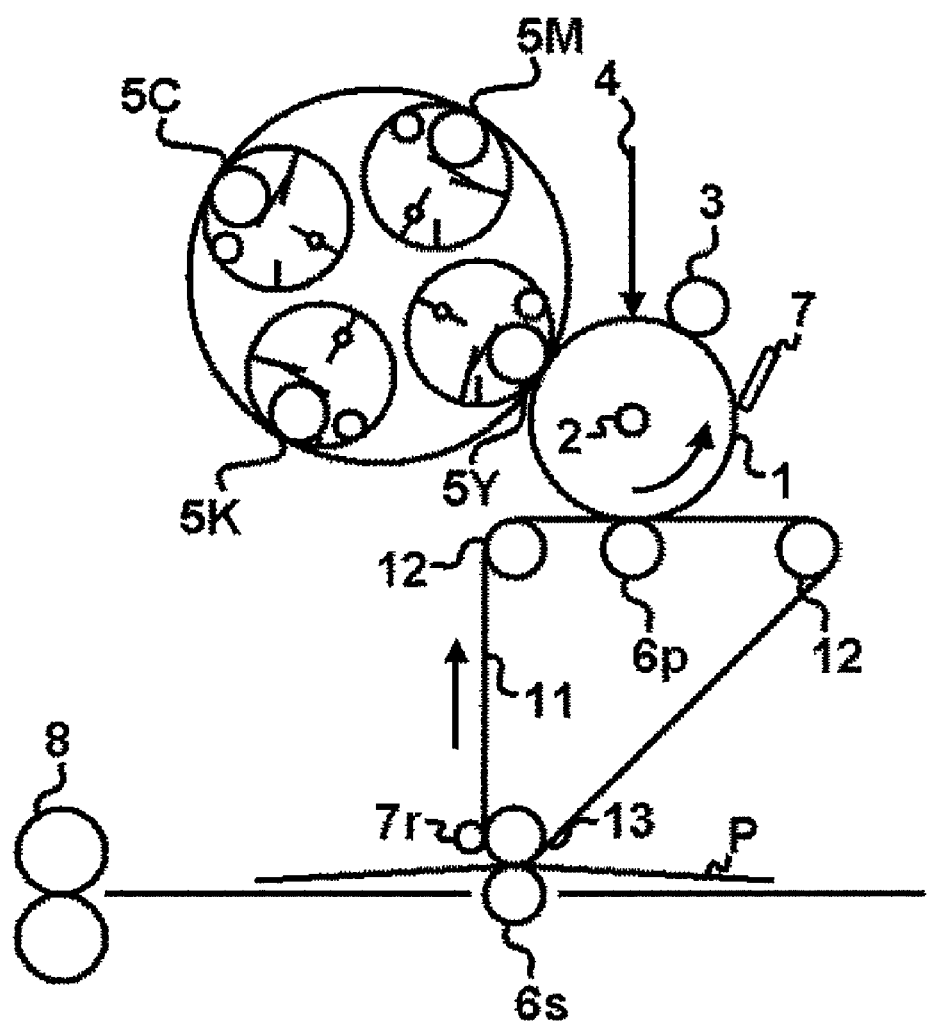
FIG. 1 is an illustration of the electrophotographic apparatus according to the present invention.

The electrophotographic belt according to the present invention includes the following (A) and (B): (A) at least one selected from the group consisting of a polyalkylene terephthalate and a polyalkylene naphthalate; and (B) a thermoplastic silicone elastomer.

The above thermoplastic silicone elastomer (B) has a repeating structural unit represented by the following structural formula (I).

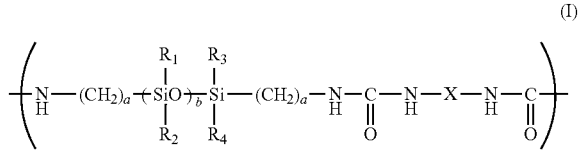

wherein $R_1$ to $R_4$ independently represent a monovalent hydrocarbon group having 1 to 20 carbon atoms; X represents a divalent hydrocarbon group having 2 to 20 carbon atoms; a is an integer of 2 to 10; and b is an integer of 1 to 4,000.

<About the Component (A)>

The at least one selected from the group consisting of a polyalkylene terephthalate and a polyalkylene naphthalate functions as a matrix resin to the thermoplastic silicone elastomer of the component (B) to be described below. As the polyalkylene naphthalate, polyethylene naphthalate can be particularly suitably used. Further, as the polyalkylene terephthalate, polyethylene terephthalate can be suitably used. In the present invention, one or more polyalkylene terephthalates may be mixed in any proportion.

<About the Component (B)>

The thermoplastic silicone elastomer of the component (B) has a repeating structural unit represented by the formula (I). As apparent from formula (I), the thermoplastic silicone elastomer according to the present invention has a polydimethylsiloxane segment having a siloxane bond in the molecular skeleton and a crystalline segment having a urea bond (—NH—CO—NH—).

In the formula (I), $R_1$ to $R_4$ independently represent a monovalent hydrocarbon group having 1 to 20 carbon atoms. Specific examples include a methyl group, an ethyl group, an n-propyl group, an isopropyl group, an n-butyl group, an isobutyl group, an n-pentyl group, an n-hexyl group, an n-heptyl group, an n-octyl group, an isooctyl group, a vinyl group, a phenyl group, a 1-phenylethyl group, a 2-phenylethyl group, a cyclopentyl group, a cyclohexyl group, and a norbornyl group. The hydrocarbon group in this case also includes fluoroalkyls such as a 3,3,3-trifluoropropyl group.

X represents a divalent hydrocarbon group having 2 to 20 carbon atoms. Examples of X include a straight-chain alkylene group, a cyclic alkylene group, and an aralkylene group, and a 4,4'-dicyclohexylmethyl group represented by following structural formula (II) can be mentioned as a specific example.

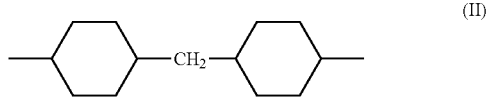
(II)

Depending on the performance required for the electrophotographic belt, additives such as a conducting agent, a compatibilizer, a dispersing agent, a colorant, and various fillers can be used in addition to the above materials.

The additives are dispersed in the belt for the purpose of improving the mechanical properties, electrical properties, and chemical properties of the belt. Specifically, the additives are dispersed in the belt for the purpose of increasing the elastic modulus of the belt to drive it without deformation even when it is used for a long period of time, controlling the charging properties on the surface of the belt to improve the transferability, and reducing the change in the belt due to various environments to allow stable use of the belt over a long period of time.

Here, the reason for having selected, in the present invention, the thermoplastic silicone elastomer of the component (B) as the additive to be dispersed in the component (A) will be described below.

The electrophotographic belt is used in a state it is stretched under a predetermined tension in the electrophotographic apparatus. When the belt is used for a long period of time, the surface of the belt may be scratched by contact with toner, an external additive to the toner, and paper. In some cases, the toner or the external additive to the toner may adhere to the surface of the belt. These may affect the quality of an electrophotographic image obtained. In order to solve these problems, improvement in the lubrication property of the surface on the electrophotographic belt has been tried. Generally, as a technique for improving the lubrication property of the belt surface, there is known a method of melt-kneading a silicone with a matrix resin at high temperatures to disperse the silicone in the matrix resin.

However, when the silicone is dispersed in the matrix resin, the selection of the silicone to be used is very important. The type of silicone includes silicone oil, silicone rubber, and a thermoplastic silicone elastomer.

The silicone oil may evaporate during the melt-kneading with the matrix resin at high temperatures, and it is difficult to control the final content of the silicone oil in the belt. Further, the matrix resin into which the silicone oil is incorporated may be inferior in moldability.

Next, the silicone rubber may be crosslinked to each other during the melt-kneading with the matrix resin to form a block, which is hard to be finely dispersed in the matrix resin. Therefore, it is difficult to sufficiently improve the lubrication property of the belt surface, and protrusions derived from an aggregate of the silicone rubber may be formed on the surface of the belt. When such an uneven belt on which protrusions are present is used as an intermediate transfer belt, the secondary transferability may be reduced.

Compared with the conventional silicone lubricants as described above, the thermoplastic silicone elastomer according to the present invention has both the properties as a silicone that is excellent in a lubrication property, water resistance, heat resistance, and electrical properties, and the properties as a thermoplastic elastomer having rubber elasticity.

The properties of silicone greatly change according to the type of the bonds of a main chain, a side chain and a terminal in the molecular chain other than the siloxane bond. Typical bonds include an ether bond, an ester bond, an amide bond, a urethane bond, and a urea bond. Various properties such as a lubrication property, water resistance, heat resistance, and electrical properties can be imparted to silicone by means of these bonds. Thus, the bond type in the molecular chain is an important factor for determining the properties of silicone.

The urea bond in the molecular chain of the above thermoplastic silicone elastomer is a polar group and is very easy to form hydrogen bonding. Accordingly, the thermoplastic silicone elastomer is easily mixed with other polar resins. Further, the silicones are easily bonded to each other by virtue of hydrogen bonding. Thereby, the above thermoplastic silicone elastomer having a urea bond greatly differs from the silicone rubber in terms of the type of crosslinking.

In the crosslinking of the silicone rubber, polymers are bonded to each other by covalent bonding and have a very high bonding force. Accordingly, when the silicone rubber is melt-kneaded at high temperatures, the given thermal energy will be consumed for cutting a moiety other than the crosslinking portion, resulting in reduction in the molecular weight of the silicone rubber to thereby decompose the silicone rubber.

On the other hand, the above thermoplastic silicone elastomer containing a urea bond is believed to be crosslinked by the hydrogen bonding. The crosslinking force by hydrogen bonding is weak as compared with the crosslinking force by the covalent bonding. Since the hydrogen bonding is a noncovalently binding intermolecular force-like interaction, this is believed to be a kind of physical crosslinking, and this physical crosslinking is easily cut by thermal energy applied.

Therefore, in the thermoplastic silicone elastomer crosslinked by hydrogen bonding, the thermal energy is consumed for cutting the hydrogen bonding, so that the silicone molecular chains are hard to be cut and the molecular weight is not easily reduced. The thermoplastic silicone elastomer containing a urea bond is hard to be decomposed even at higher temperatures. That is, the thermoplastic silicone elastomer is excellent in heat resistance. Therefore, the thermoplastic silicone elastomer according to the present invention can be melt-kneaded at high temperatures along with a matrix resin having a high melting point.

Further, even if the hydrogen bonding is cut upon the application of thermal energy, the hydrogen bonding will be formed again when it is cooled. The cutting and reproduction of hydrogen bonding is believed to be a reversible reaction. The thermoplastic silicone elastomer having such properties is stable in terms of energy and only shows a small reduction in the properties according to change in temperature.

The thermoplastic silicone elastomer used in the present invention can be dispersed in a matrix resin without reducing the properties of the silicone.

Conventional silicone rubbers had poor dispersibility in a matrix resin due to crosslinking or depolymerization during the melt-kneading. As a result, there was a case where surface smoothness was reduced or a lubrication property was insufficiently exhibited. This is because surface unevenness increases as a result of the change in the properties of the silicone rubber by crosslinking or the projection of a block of the silicone rubber to the belt surface. Further, a block of the silicone rubber which is present in the interior of the belt is a factor to cause a reduction in adhesion of the silicone rubber to a matrix resin phase, leading to a reduction in the mechanical strength of the belt and deterioration in the durability of the belt.

However, in the electrophotographic belt according to the present invention, the thermoplastic silicone elastomer is uniformly dispersed. Accordingly, the belt is excellent in the surface lubrication property and surface smoothness. Further, since the thermoplastic silicone elastomer is finely compatible with and dispersed in the matrix resin, the adhesion between the silicone elastomer and the matrix resin phase is improved so that the belt has high mechanical strength and is excellent in the durability.

The surface smoothness of the belt is an important factor for the secondary transferability in electrophotography, and if the surface smoothness is poor, the quality of an image obtained in the initial stage of image reproduction will significantly deteriorate. The reason is explained as follows: if the unevenness on the belt is large, toner will not be stably held, and fine resistance unevenness may occur due to the difference in the toner layer thickness, or a difference may arise in the electrostatic adsorption force between the belt and the toner. If the difference of the electrostatic adsorption force is large, the voltage control required for efficient secondary transfer will be difficult, causing a reduction in the secondary transferability.

However, since the belt in which the thermoplastic silicone elastomer used in the present invention is dispersed is excellent in the surface smoothness, the toner is stably held on the belt. Since the electrostatic adsorption force to the toner held on the belt is also uniformly applied, the voltage control is easy and the secondary transferability improves. Further, since the urea group in the silicone molecular chain has a very small crosslinking force, an increase in resistance by the crosslinking can be relieved, and a reduction in transferability by the fine resistance unevenness of the belt can be suppressed. Accordingly, the belt in which the thermoplastic elastomer containing a urea bond is dispersed is very effective for improving secondary transferability.

The thermoplastic silicone elastomer used in the present invention also has the characteristics as a thermoplastic elastomer. Since the thermoplastic elastomer has rubber elasticity, it can help improve the mechanical properties of the belt and, in particular, control the elastic modulus thereof. The elastomer has an additional feature that it can control the belt so as to have such a strength that produces less residual curling on the belt even if it is used for a long period of time. The residual curling refers to a permanent strain generated in the portion of a belt that has been wound around rollers when the belt which is put around and stretched over between a driving roller and a driven roller is left standing for a certain period of time. If the permanent strain is high, a difference will arise in the internal stress of the belt, causing fracture, or the retransfer of toner will occur in the secondary transfer part, which may cause a reduction in the secondary transferability. It is also effective in the present invention to control the elastic modulus of the belt and reduce the residual curling by dispersing the thermoplastic silicone elastomer in the matrix resin.

In the present invention, the content of the thermoplastic silicone elastomer in the matrix resin is desirably 0.1 to 10% by mass. When the content of the thermoplastic silicone elastomer in the matrix resin is within the above range, the effect of improving the surface lubrication property of the belt can be more positively exhibited without having large influence on the elastic modulus of the electrophotographic belt.

As described above, the belt having excellent moldability and mechanical properties can be produced by using the thermoplastic silicone elastomer according to the present invention, even if a step of melt-kneading at high temperatures is involved.

Further, the thermoplastic silicone elastomer of the present invention is compatible with the matrix resin and can be finely dispersed in the matrix resin by the presence of the urea bond contained in the molecular chain. Therefore, the produced belt is very excellent also in the surface smoothness or secondary transferability.

<Belt Manufacturing Method>

Figure 2:
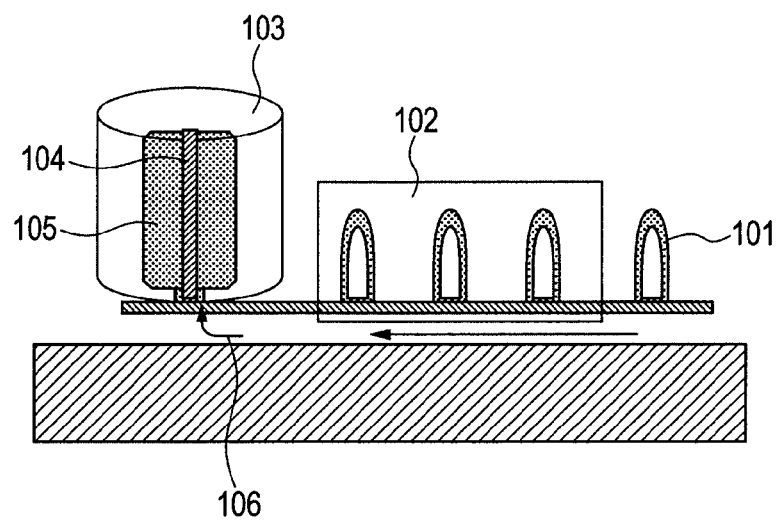
FIG. 2 is a schematic diagram of an example of a blow molding apparatus.

Examples of molding methods of the seamless-shaped electrophotographic belt according to the present invention include centrifugal molding, tube extrusion, inflation molding, extrusion, cylinder extrusion, and blow molding. Among these, the blow molding shown in FIG. 2 is particularly preferred. FIG. 2 shows a test tube-shaped preform 101, a heating furnace 102, a blow mold 103, a drawing rod 104, a blow molded article 105, and an air inflow port 106.

The feature of blow molding resides in that molecular orientation occurs by drawing to thereby improve the mechanical strength of the belt, and the blow molding is excellent in molding reproducibility and can form a belt having a small film thickness unevenness. Further, it is possible to cut cost because the molding can be performed at high speed and a recycled product can be reused.

The details of an embodiment of blow molding are shown below.

Figure 3:
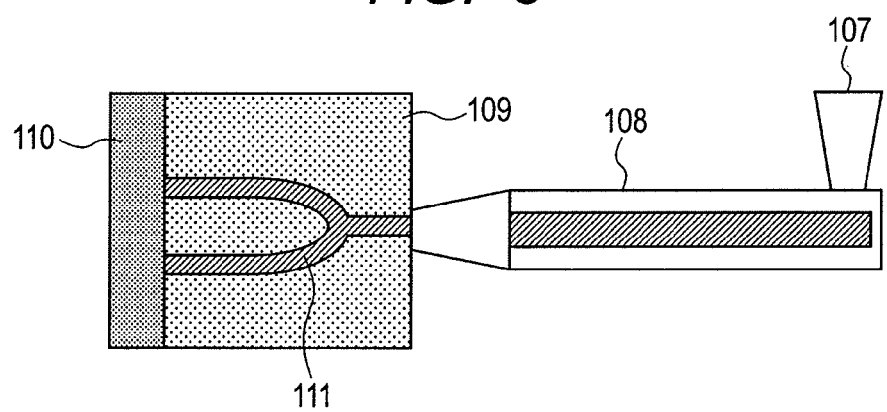
FIG. 3 is a schematic diagram of an example of an injection molding apparatus.
Figure 4:
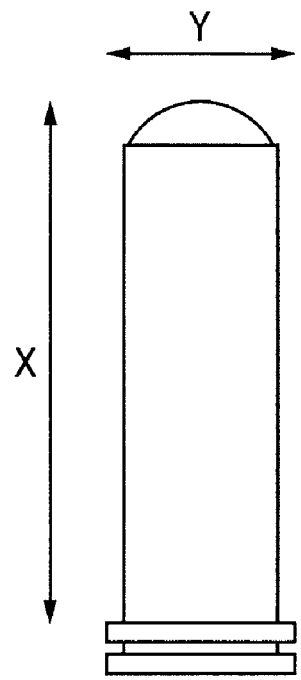
FIG. 4 is an illustration of a preform produced by the present invention.

The matrix resin and the thermoplastic silicone elastomer dried at 140° C. for 6 hours or more are melt-kneaded with a twin-screw extruder at 260° C. The uniformly mixed components are extruded as a strand having a diameter of about 2 mm, solidified with cold water, and cut to produce a pellet. Since moldability is reduced if the resin contains water, the produced pellet is dried at 140° C. for 6 hours or more. The dried pellet is fed into an injection molding apparatus as shown in FIG. 3, which is controlled to 285° C. to perform injection molding to produce a preform as shown in FIG. 4. FIG. 3 shows a hopper 107, an injection molding apparatus 108, a cavity mold 109, a core mold 110, and a preform 111 which is molded with the resin filled in the cavity.

Figure 5:
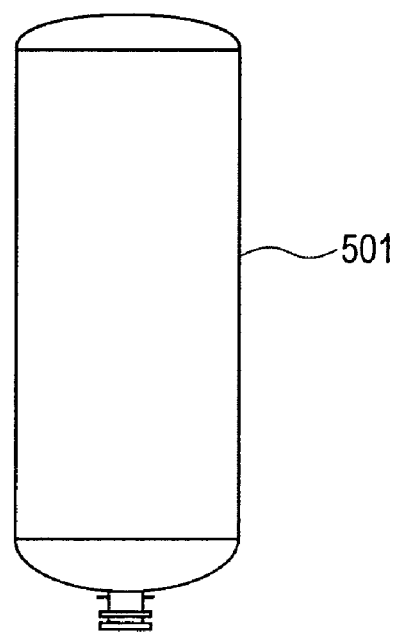
FIG. 5 is an illustration of a bottle-shaped molded product produced by the present invention.

Next, blow molding is performed using the produced preform. The preform is placed in the blow molding apparatus as shown in FIG. 2, and the preform is heated with an external heating heater and an internal heating heater to the glass transition temperature or higher. The preform heated to the glass transition temperature or higher is pinched at the opening part thereof with a sealed cylindrical metal mold, drawn upward with a drawing rod, and then biaxially drawn in the transverse direction by flowing air to produce a bottle-shaped molded product as shown in FIG. 5.

Subsequently, the produced bottle-shaped molded product is inserted into a seamless cylindrical metal mold; air of 0.05 MPa is allowed to flow into the inner part of the bottle; the opening part of the bottle is sealed; and the metal mold is heated to 200° C. while being rotated and then cooled to room temperature. The upper and lower sides of the heat-treated bottle-shaped molded product removed from the cylindrical metal mold are cut with an ultrasonic cutter to obtain a seamless electrophotographic belt having the target size.

EXAMPLES

Example 1

Production of the Electrophotographic Belt

The materials in Table 1-1 were melt-kneaded with a twin-screw extruder at 260° C. to uniformly mix the components. The resulting mixture was extruded as a strand having a diameter of about 2 mm, and then the strand was cut to produce a pellet. This pellet was used as a raw material for molding (1).

TABLE 1-1

| | |
|---|---|
| PEN resin (trade name: Teonex TN-8050SC, manufactured by Teijin Chemicals Ltd.) | 80 Parts by mass |
| Polyether ester amide resin (trade name: TPAE-10HP-10, manufactured by Fuji Kasei Kogyo Co., Ltd.) | 15 Parts by mass |
| Thermoplastic silicone elastomer (*) (trade name: GENIOMER 140, manufactured by Wacker Chemie AG) | 3 Parts by mass |
| Carbon black (trade name: MA-100, manufactured by Mitsubishi Chemical Corporation) | 2 Parts by mass |

(*) "GENIOMER 140" is a thermoplastic silicone elastomer represented by the formula (I), wherein X is a 4,4'-dicyclohexyl methyl group having 13 carbon atoms, a = 3, b = 39, and the weight average molecular weight (Mn) is about 36,000.

Next, the raw material for molding (1) dried at a temperature of 140° C. for 6 hours was fed into the hopper 107 of the injection molding apparatus 108 as shown in FIG. 3 and molded at a preset temperature of 285° C. to obtain a test tube-shaped preform. The mold temperature at this time was set to 15° C. With respect to the size of the preform having a test tube shape as shown in FIG. 4, X is 136 mm, and Y is 25 mm, in FIG. 4. This preform was fed into the blow molding apparatus as shown in FIG. 2 and molded under the following conditions to obtain a bottle-shaped molded product 501 as shown in FIG. 5.

Machine direction draw ratio: 3.2 times;
Transverse direction draw ratio: 4.9 times;
Heating position: Preform is divided into five parts in the machine direction;
Temperature at the center position of preform: 160° C.;
Primary pressure: 0.8 MPa;
Time from the start of movement of the drawing rod to the inflow of gas: 0.3 sec;
Secondary pressure: 0.8 MPa; and
Blow mold temperature: 15° C.

Next, the bottle-shaped molded product 501 obtained was inserted into a seamless cylindrical metal mold. The seamless cylindrical metal mold used at this time was a metal mold made by electroforming.

Specifically, after inserting the bottle-shaped molded product 501 into the inner part of the seamless cylindrical metal mold, a bottom mold and a shoulder mold were attached. Then, air of 0.05 MPa was allowed to flow into the inner part of the bottle, and the opening part of the bottle was sealed. Subsequently, the seamless cylindrical metal mold was placed in a heating apparatus and heated from 25° C. to 190° C. over 100 seconds with a halogen heater while being rotated at 30 rpm. After reaching 190° C., the temperature of the metal mold was cooled to 25° C. over 50 seconds by applying air. Subsequently, the heat-treated bottle-shaped molded product was removed from the seamless cylindrical metal mold and visually observed. Neither distortions nor depressions were observed in the molded product.

The top end and bottom end of the heat-treated bottle-shaped molded product were cut with an ultrasonic cutter to obtain an electrophotographic belt having a length of 250 mm and a diameter of 119 mm. The electrophotographic belt had an average film thickness of 71 µm and a film thickness unevenness of the belt central part of 71±5 µm.

<Evaluations>

The produced electrophotographic belt was evaluated as follows.

(Surface Roughness)

The arithmetic average roughness (Ra) and the ten-point average roughness (Rzjis) were measured using a surface roughness measuring apparatus (trade name: KOSAKA-SE3500, manufactured by NIHONKAI KEISOKU TOKKI CO, LTD.). A test piece (30 mm×30 mm) was cut from the central part of the produced electrophotographic seamless belt and used as a sample for measurement. The sample was fixed to a sample stand with adhesives, and a measuring terminal was brought into contact with the sample and scanned a distance of 4.0 mm at a speed of 0.1 mm/sec in the belt width direction to measure the roughness.

(Coefficient of Friction (µ))

A friction tester (trade name: FPR-2100 type, manufactured by RHESCA Corporation) was used for the measurement. A test piece (30 mm×30 mm) cut from the central part of the electrophotographic seamless belt was used as a measuring sample. A weight of 300 g was fixed on a measuring terminal with a ball in order to impart a load between the measuring terminal and the measuring sample, and the measuring terminal was brought into contact with the surface of the measuring sample. Then, the measurement was performed by moving the measuring terminal in a clockwise circular motion on the belt surface under the conditions of a rotational radius of 10 mm, a rotational speed of 10 rpm, and a number of rotations of 100. The results of the measurement of the surface roughness and the coefficient of friction are shown in Table 2.

(Image Evaluation 1)

The electrophotographic belt was mounted on the full-color electrophotographic apparatus (FIG. 1) as an intermediate transfer belt to print a solid black image on paper. Paper with a coarse surface having an arithmetic average roughness (Ra) of 4.0 µm and a ten-point average roughness (Rzjis) of 15 µm was used for the paper. Further, the paper was placed in the environment of a temperature of 23° C. and a humidity of 45% RH for one day before it was used for the image evaluation. With respect to the evaluation, an image printed on the 10th sheet was evaluated for the secondary transferability by visual observation.

As a result, the transfer unevenness could not be observed, and the image quality was very good. Note that, FIG. 1 shows a photoconductive drum 1, a shaft 2, a primary charging unit 3, image exposure light 4 from an imagewise exposure unit (not shown), developing units 5C, 5K, 5M, and 5Y for the colors of cyan, black, magenta, and yellow, respectively, transfer members 6p and 6s, a cleaning member 7, an auxiliary roller 7r, a fixing unit 8, an intermediate transfer member 11, a tension roller 12, a cleaning apparatus 13, and a transfer medium P such as paper.

(Image Evaluation 2)

The image obtained after 10,000 full-color images were further continuously printed was evaluated as a durable image (1). When the durable image (1) was evaluated by visual observation for the secondary transferability, small transfer unevenness was observed in a part of the image area, but the image quality was good.

Example 2

Production of the Electrophotographic Belt

An electrophotographic belt was obtained in the same manner as in Example 1 except that the materials in Table 1-2 were used. The electrophotographic belt had an average film thickness of 68 μm and a film thickness unevenness of the belt central part of 68±5 μm.

TABLE 1-2

| | |
|---|---|
| PET resin (trade name: TR4550K, manufactured by Teijin Chemicals Ltd.) | 78 Parts by mass |
| Polyether ester amide resin (trade name: TPAE-10HP-10, manufactured by Fuji Kasei Kogyo Co., Ltd.) | 15 Parts by mass |
| Silicone elastomer (trade name: GENIOMER 140, manufactured by Wacker Chemie AG) | 5 Parts by mass |
| Carbon black (trade name: MA-100, manufactured by Mitsubishi Chemical Corporation) | 2 Parts by mass |

<Evaluations>

The produced electrophotographic belt was evaluated for the surface roughness and the coefficient of friction in the same manner as in Example 1. The results are shown in Table 2. Image evaluations were also performed in the same manner as in Example 1. As a result, in the (Image evaluation 1), the transfer unevenness could not be observed, and the image quality was very good.

Further, in the (Image evaluation 2), small transfer unevenness was observed over the whole image area, but the image quality was good.

Example 3

Production of the Electrophotographic Belt

An electrophotographic belt was obtained in the same manner as in Example 1 except that the materials in Table 1-3 were used. The belt had an average film thickness of 69 μm and a film thickness unevenness of the belt central part of 69±6 μm.

TABLE 1-3

| | |
|---|---|
| PEN resin (trade name: Teonex TN-8050SC, manufactured by Teijin Chemicals Ltd.) | 70 Parts by mass |
| Polyether ester amide resin (trade name: TPAE-10, manufactured by Fuji Kasei Kogyo Co., Ltd.) | 18 Parts by mass |
| Silicone elastomer (trade name: GENIOMER 140, manufactured by Wacker Chemie AG) | 10 Parts by mass |

TABLE 1-3-continued

| | |
|---|---|
| Carbon black (trade name: MA-100, manufactured by Mitsubishi Chemical Corporation) | 2 Parts by mass |

<Evaluations>

The produced electrophotographic belt was evaluated for the surface roughness and the coefficient of friction in the same manner as in Example 1. The results are shown in Table 2. Image evaluations were also performed in the same manner as in Example 1. As a result, in the (Image evaluation 1), the transfer unevenness could not be observed, and the image quality was very good.

Further, in the (Image evaluation 2), small transfer unevenness was observed over the whole image area, but the image quality was good.

Example 4

Production of the Electrophotographic Belt

An electrophotographic belt was obtained in the same manner as in Example 1 except that the materials in Table 1-4 were used. The belt had an average film thickness of 72 μm and a film thickness unevenness of the belt central part of 72±6 μm.

TABLE 1-4

| | |
|---|---|
| PEN resin (trade name: Teonex TN-8050SC, manufactured by Teijin Chemicals Ltd.) | 64 Parts by mass |
| PET resin (trade name: TR4550K, manufactured by Teijin Chemicals Ltd.) | 16 Parts by mass |
| Polyether ester amide resin (trade name: TPAE-10HP-10, manufactured by Fuji Kasei Kogyo Co., Ltd.) | 15 Parts by mass |
| Silicone elastomer (trade name: GENIOMER 140, manufactured by Wacker Chemie AG) | 3 Parts by mass |
| Carbon black (trade name: MA-100, manufactured by Mitsubishi Chemical Corporation) | 2 Parts by mass |

<Evaluations>

The produced electrophotographic belt (4) was evaluated for the surface roughness and the coefficient of friction in the same manner as in Example 1. The results are shown in Table 2. Image evaluations were also performed in the same manner as in Example 1. As a result, in the (Image evaluation 1), small transfer unevenness was observed in a part of the image area, but the image quality was good. Further, in the (Image evaluation 2), small transfer unevenness was observed over the whole image area, but the image quality was good.

Example 5

Production of the Electrophotographic Belt

An electrophotographic belt was obtained in the same manner as in Example 1 except that the materials in Table 1-5 were used. The belt had an average film thickness of 71 μm and a film thickness unevenness of the belt central part of 69±6

TABLE 1-5

| | |
|---|---|
| PEN resin (trade name: Teonex TN-8050SC, manufactured by Teijin Chemicals Ltd.) | 79.9 Parts by mass |

TABLE 1-5-continued

| | |
|---|---|
| Polyether ester amide resin (trade name: TPAE-10, manufactured by Fuji Kasei Kogyo Co., Ltd.) | 18 Parts by mass |
| Silicone elastomer (trade name: GENIOMER 140, manufactured by Wacker Chemie AG) | 0.1 Parts by mass |
| Carbon black (trade name: MA-100, manufactured by Mitsubishi Chemical Corporation) | 2 Parts by mass |

<Evaluations>

The produced electrophotographic belt was evaluated for the surface roughness and the coefficient of friction in the same manner as in Example 1. The results are shown in Table 2. Image evaluations were also performed in the same manner as in Example 1. As a result, in the (Image evaluation 1), small transfer unevenness was observed in a part of the image area, but the image quality was good. Further, in the (Image evaluation 2), small transfer unevenness was observed over the whole image area, but the image quality was good.

Example 6

Production of the Electrophotographic Belt

An electrophotographic belt was obtained in the same manner as in Example 1 except that the materials in Table 1-6 were used. The belt had an average film thickness of 69 μm and a film thickness unevenness of the belt central part of 70±6 μm.

TABLE 1-6

| | |
|---|---|
| PEN resin (Teonex TN-8050SC, manufactured by Teijin Chemicals Ltd.) | 77 Parts by mass |
| Polyether ester amide resin (TPAE-10, manufactured by Fuji Kasei Kogyo Co., Ltd.) | 18 Parts by mass |
| Silicone elastomer (GENIOMER 140 modified*, manufactured by Wacker Chemie AG) | 3 Parts by mass |
| Carbon black (MA-100, manufactured by Mitsubishi Chemical Corporation) | 2 Parts by mass |

*"GENIOMER 140 modified" is a silicone elastomer represented by the formula (I), wherein X is an ethylene group.

<Evaluations>

The produced electrophotographic belt was evaluated for the surface roughness and the coefficient of friction in the same manner as in Example 1. The results are shown in Table 2. Image evaluations were also performed in the same manner as in Example 1. As a result, in the (Image evaluation 1), small transfer unevenness was observed in a part of the image area, but the image quality was good. Further, in the (Image evaluation 2), small transfer unevenness was observed over the whole image area, but the image quality was good.

Comparative Example 1

Production of the Electrophotographic Belt

An electrophotographic belt was obtained in the same manner as in Example 1 except that the materials in Table 1-7 were used. The belt had an average film thickness of 73 μm and a film thickness unevenness of the belt central part of 73±10 μm.

TABLE 1-7

| | |
|---|---|
| PEN resin (trade name: Teonex TN-8050SC, manufactured by Teijin Chemicals Ltd.) | 82 Parts by mass |
| Polyether ester amide resin (trade name: TPAE-10HP-10, manufactured by Fuji Kasei Kogyo Co., Ltd.) | 15 Parts by mass |
| Silicone rubber (trade name: KE555-U, manufactured by Shin-Etsu Chemical Co., Ltd.) | 3 Parts by mass |
| Carbon black (trade name: MA-100, manufactured by Mitsubishi Chemical Corporation) | 2 Parts by mass |

<Evaluations>

The produced electrophotographic belt was evaluated for the surface roughness and the coefficient of friction in the same manner as in Example 1. The results are shown in Table 2. Image evaluations were also performed in the same manner as in Example 1. As a result, in the (Image evaluation 1), large transfer unevenness was observed in a part of the image area. Further, in the (Image evaluation 2), large transfer unevenness was observed over the whole image area.

Comparative Example 2

Production of the Electrophotographic Belt

An electrophotographic belt was obtained in the same manner as in Example 1 except that the materials in Table 1-8 were used. The belt had an average film thickness of 70 μm and a film thickness unevenness of the belt central part of 70±4 μm.

TABLE 1-8

| | |
|---|---|
| PEN resin (trade name: Teonex TN-8050SC, manufactured by Teijin Chemicals Ltd.) | 83 Parts by mass |
| Polyether ester amide resin (trade name: TPAE-10HP-10, manufactured by Fuji Kasei Kogyo Co., Ltd.) | 15 Parts by mass |
| Carbon black (trade name: MA-100, manufactured by Mitsubishi Chemical Corporation) | 2 Parts by mass |

<Evaluations>

The produced electrophotographic belt was evaluated for the surface roughness and the coefficient of friction in the same manner as in Example 1. The results are shown in Table 2. Image evaluations were also performed in the same manner as in Example 1. As a result, in the (Image evaluation 1), small transfer unevenness was observed over the whole image area. Further, in the (Image evaluation 2), large transfer unevenness was observed over the whole image area.

TABLE 2

| | Surface roughness | | |
|---|---|---|---|
| | Ra (μm) | Rz (μm) | μ |
| Example | | | |
| 1 | 0.21 | 1.44 | 0.132 |
| 2 | 0.23 | 1.65 | 0.124 |
| 3 | 0.27 | 1.70 | 0.139 |
| 4 | 0.34 | 1.96 | 0.155 |
| 5 | 0.19 | 1.32 | 0.215 |
| 6 | 0.25 | 1.43 | 0.169 |

TABLE 2-continued

| | Surface roughness | | |
| --- | --- | --- | --- |
| | Ra (μm) | Rz (μm) | μ |
| Comparative Example | | | |
| 1 | 0.68 | 3.72 | 0.170 |
| 2 | 0.18 | 1.24 | 0.238 |

This application claims the priority right from Japanese Patent Application No. 2009-297563 filed on Dec. 28, 2009, the contents of which are incorporated herein by reference.

What is claimed is:

1. A seamless electrophotographic belt comprising:
a component A and a component B,
wherein the component A is at least one selected from the group consisting of a polyalkylene terephthalate and a polyalkylene naphthalate,
wherein the component B is a thermoplastic silicone elastomer having a repeating structural unit represented by the following formula (I):

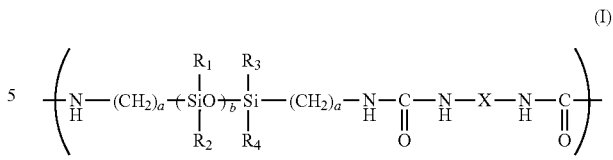

wherein $R_1$ to $R_4$ independently represent a monovalent hydrocarbon group having 1 to 20 carbon atoms, X represents a divalent hydrocarbon group having 2 to 20 carbon atoms, a is an integer of 2 to 10, and b is an integer of 1 to 4,000, and
wherein the component B is dispersed in the component A.

2. The electrophotographic belt according to claim 1, wherein $R_1$ to $R_4$ are each a methyl group, and X is a 4,4'-dicyclohexyl methyl group, in the formula (I).

3. The electrophotographic belt according to claim 1, wherein the polyalkylene terephthalate is polyethylene terephthalate.

4. The electrophotographic belt according to claim 1, wherein the polyalkylene naphthalate is polyethylene naphthalate.

5. An electrophotographic apparatus comprising the electrophotographic belt according to claim 1 as an intermediate transfer belt.

* * * * *